United States Patent [19]
Yamada et al.

[11] Patent Number: 5,959,597
[45] Date of Patent: Sep. 28, 1999

[54] IMAGE/AUDIO REPRODUCING SYSTEM

[75] Inventors: Yuji Yamada, Tokyo; Kiyofumi Inanaga, Kanagawa, both of Japan

[73] Assignee: Sony Corporation, Tokyo, Japan

[21] Appl. No.: 08/715,083

[22] Filed: Sep. 19, 1996

[30] Foreign Application Priority Data

Sep. 28, 1995 [JP] Japan .................................. 7-250978

[51] Int. Cl.⁶ .................................................. G09G 5/00
[52] U.S. Cl. .................. 345/8; 345/7; 345/9; 348/51; 348/53
[58] Field of Search ................... 345/7, 8, 9; 348/51–60, 348/739–42, 744

[56] References Cited

U.S. PATENT DOCUMENTS

| | | | |
|---|---|---|---|
| 4,028,725 | 6/1977 | Lewis ........................................ | 348/115 |
| 4,446,480 | 5/1984 | Breglia et al. ............................ | 348/115 |
| 4,649,504 | 3/1987 | Krouglicof et al. ..................... | 364/559 |
| 4,722,601 | 2/1988 | McFarlane ................................ | 345/8 |
| 4,817,149 | 3/1989 | Myers ........................................ | 381/1 |
| 4,897,715 | 1/1990 | Beamon, III .............................. | 358/93 |
| 5,222,059 | 6/1993 | Holman .................................... | 369/89 |
| 5,322,441 | 6/1994 | Lewis et al. ............................. | 434/307 |
| 5,457,641 | 10/1995 | Zimmer et al. .............................. | 345/8 |
| 5,647,016 | 7/1997 | Takeyama ................................. | 382/103 |

*Primary Examiner*—Jeffery A. Hofsass
*Assistant Examiner*—Ashok Mannava
*Attorney, Agent, or Firm*—Jay H. Maioli

[57] ABSTRACT

An audio reproducing unit 2 has a audio signal processor 5 responsive to results of detection by a turning angular velocity sensor 16 for carrying out calculations for localizing the input audio outside the head of a wearer of a head attachment unit 15, for preventing the sound image orientation from following head turning movement and for setting the sound image orientation in a pre-set direction in the viewing/hearing environment of the wearer. The image reproducing unit 10 has an image signal processor 12 for setting the input image in a pre-set orientation in the viewing/hearing environment of the wearer responsive to the results of detection by the turning angular velocity sensor 16.

24 Claims, 14 Drawing Sheets

IMAGE/AUDIO REPRODUCING SYSTEM

BACKGROUND OF THE INVENTION

This invention relates to an image/audio reproducing system for receiving the image and the audio and being arranged on the head of a user.

Heretofore, reproduction of the feeling of reality in an image/audio reproducing system has been mainly by a large-format screen and by enlarging the system size by multi-speaker reproduction. Recently, an image/audio reproducing device 100, made up of a head attachment type image display unit 101 of a reduced size and an audio reproducing unit 102 annexed to the unit 101, as shown in FIG. 1, has come into use with a view to conforming to personal taste and reduction in size.

The image display unit 101 is driven by a driving circuit 104, supplied with a video input signal from a video input terminal 103, for displaying an image, as shown in FIG. 2.

The audio reproducing unit 102 amplifies an audio input signal, entering an audio input terminal 105, by amplifiers 106L, 106R, and transmits the amplified signals to a headphone speaker for left ear 107L and a headphone speaker for right ear 107R, for the furnishing the audio to the user, as shown in FIG. 2.

Since the audio reproducing unit 102 localizes the sound image within the head of the user, the audio is not matched to the image displayed on the video display unit 101, so that the feeling of reality cannot be reproduced spontaneously.

For overcoming this drawback, attempts have been made in updating the image and the audio on a real-time basis responsive to the body movements and in convolving the sound field to get close to the feeling of reality by, for example, a digital signal processing unit, for regenerating the viewing/hearing environment close to reality.

In these attempts, voluminous signal processing is required particularly in audio processing, such that the image/audio reproducing apparatus cannot be reduced to a size for attachment to the head. In addition, a motion detector tends to be costly.

If the sound image can be localized outside the head such that a sound field feeling close to reality can be achieved, but the video system is moved in the viewing/hearing environment to follow up with the head movement as heretofore, significant deviation is produced between the sound image position and the visual image position, thus resulting in non-spontaneous image/audio reproduction.

If the image contents are updated depending on head movements using a special source, both the video system and the audio system become increased in size and become costly.

SUMMARY OF THE INVENTION

It is therefore an object of the present invention to provide an image/audio reproducing apparatus whereby the sound image position and the visual image position can be brought into coincidence inexpensively without requiring special sources.

With the image audio reproducing apparatus according to the present invention, the audio signal processor of and audio reproducing unit performs signal processing for localizing a reproduced sound image outside the head and setting the sound image orientation in a pre-set orientation in a viewing/hearing environment irrespective of the head turning movement. In addition, the image signal processor of the image reproducing unit performs signal processing of setting an image perception position in a pre-set orientation in the viewing/hearing environment responsive to the head turning movement.

Also, with the image audio reproducing apparatus of the present invention, the audio reproducing unit has an audio signal processor for adding time difference, phase difference, level difference or the frequency response to an output of each of two digital filters based on the head turning angle of the head turning movement. The digital filters convolve two channels of the impulse response on plural audio input signals. In addition, the image reproducing unit performs signal processing on the input image signals for setting the image perception position of the input image signal in a preset orientation in the viewing/hearing environment depending on the head turning angle.

In addition, with the image audio reproducing apparatus of the present invention, image audio signal generating means provided on other portions of the apparatus than the head attachment unit is caused to output the audio signal and the image signal with fixed viewing/hearing environment to two speakers and image display units provided on the head attachment unit based on the position information matched to the head turning movement as detected by the turning angle detector.

With the image audio reproducing apparatus according to the present invention, since the audio signal processor of the audio reproducing unit performs signal processing for localizing a reproduced sound image outside the head and for setting the sound image orientation in a pre-set orientation in a viewing/hearing environment irrespective of head turning movement, while the image signal processor of image reproducing unit performs signal processing of setting the image perception position in a pre-set orientation in the viewing/hearing environment responsive to the head turning movement. Thus the sound image can be localized outside the head of the user, in particular in the forward direction which is the direction thought to be difficult to achieve localization. Since the image position is fixed at a constant position, the sound image localization position and the visual image position are coincided with each other thus eliminating an alien feeling otherwise produced by non-coincidence between the two positions. Moreover, as a result of synergistic effects of the audio and the image, sound image can be localized more definitely than if only the audio is reproduced, thus achieving more realistic image audio reproduction. In addition, outside-head sound-image localization can be achieved by signal processing of a simpler configuration, so that a small-sized inexpensive readily portable apparatus may be produced.

If account is taken of parallax in the input image signals, a three-dimensional image having a far-and-near feeling may be reproduced. The localized sound image position is coincided with the visual image position so that no alien feeling is produced. The audio source three-dimensionally displayed on the display may perpetually be coincided with the actual sound image position.

Since a portion of image signals can be selectively displayed by the image reproducing unit, the localized sound image position and the visual image position can be set relative to the viewing/hearing environment without diminishing the amount of the visual image as seen by the viewer by head movement in a pre-set range.

Since a present invention is applied to a system in which an image can be synthesized on the real-time basis, such as computer graphics, the image contents can be updated and displayed responsive to head turning movement, the localized sound image position and the visual image position can be fixedly set relative to the viewing/hearing environment without diminishing the amount of the visual image as seen by the viewer even if the head is moved within a pre-set extent.

The audio reproducing unit and the image reproducing unit can set the sound image direction in a pre-set orientation in the viewing/hearing environment only within a certain range centered about the directly forward orientation, and the audio orientation is moved responsive to head movement only if the above range is exceeded. Thus, there is no risk of any significant deviation between the visual image direction and the sound image orientation, while it becomes possible to realize forward sound image orientation by dynamic audio signal processing. If the image audio source is a motion picture in which the amount of motion is usually small and in which no wide image display range is required, image audio reproduction may be achieved with sufficient reality and presence.

In addition, with the present invention, a rotation detector and audio reproducing unit are provided on the head attachment portion, and head motion is detected, while the visual image direction and the sound image direction are changed only in a certain range centered about the forward direction as if the image direction and the sound image direction were fixed in a certain orientation in the viewing/hearing environment, and both the visual image orientation and the sound image orientation are changed if the above range is exceeded. Thus, if the information capacity of an image, the display contents of which are changed with head movement, is limited, the range of head turning movement can be limited and occasionally the visual image orientation and the sound image orientation can be set in a certain orientation in the viewing/hearing environment.

By enclosing the audio reproducing unit in the head attachment unit, image audio signals having a common audio signal source can be entered without resorting to special recording, such as binaural recording, for realizing audio reproduction with sufficient presence feeling and outside-head localization. The result is that a readily portable virtual reality system can be constructed with a smaller size.

By providing position detector on the head attachment unit along with or in place of a position detector, visual image control as well as sound image control becomes possible not only if the wearer makes a turning movement but also if the wearer moves his or her position in the viewing/hearing environment thus achieving a virtual reality system with sufficient presence feeling and with a small size.

DESCRIPTION OF THE PREFERRED EMBODIMENTS

Figure 1:
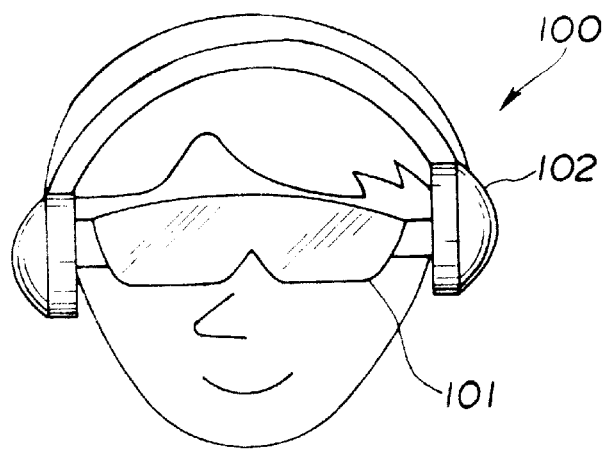
FIG. 1 is a schematic view showing a conventional head attachment type video-audio reproducing apparatus.
Figure 2:
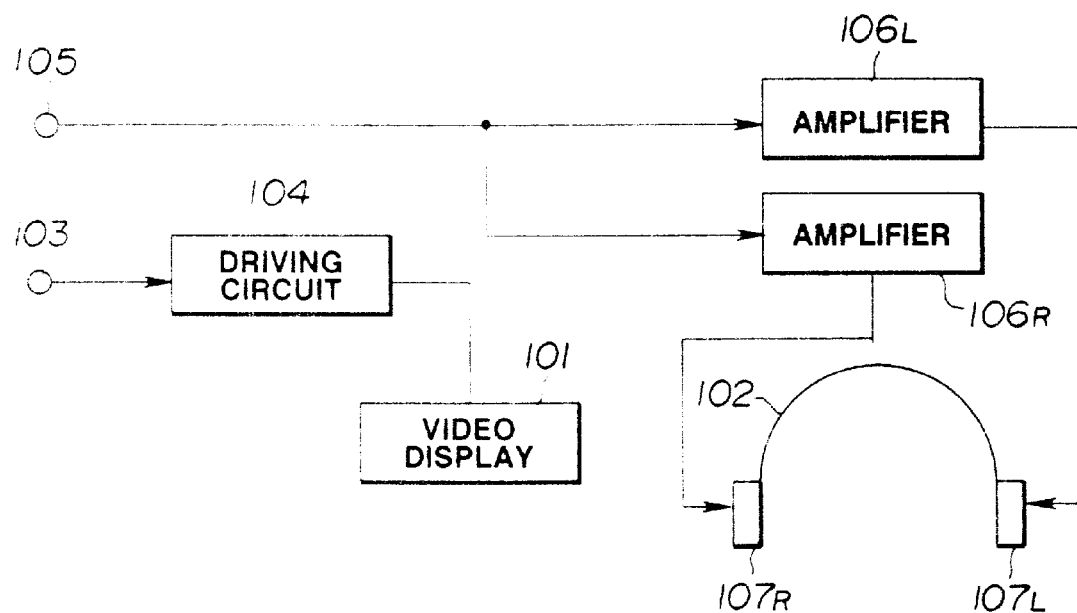
FIG. 2 is a block diagram showing the conventional image/audio reproducing apparatus.

Referring to the drawings, illustrative preferred embodiments of the present invention will be explained in detail.

Figure 3:
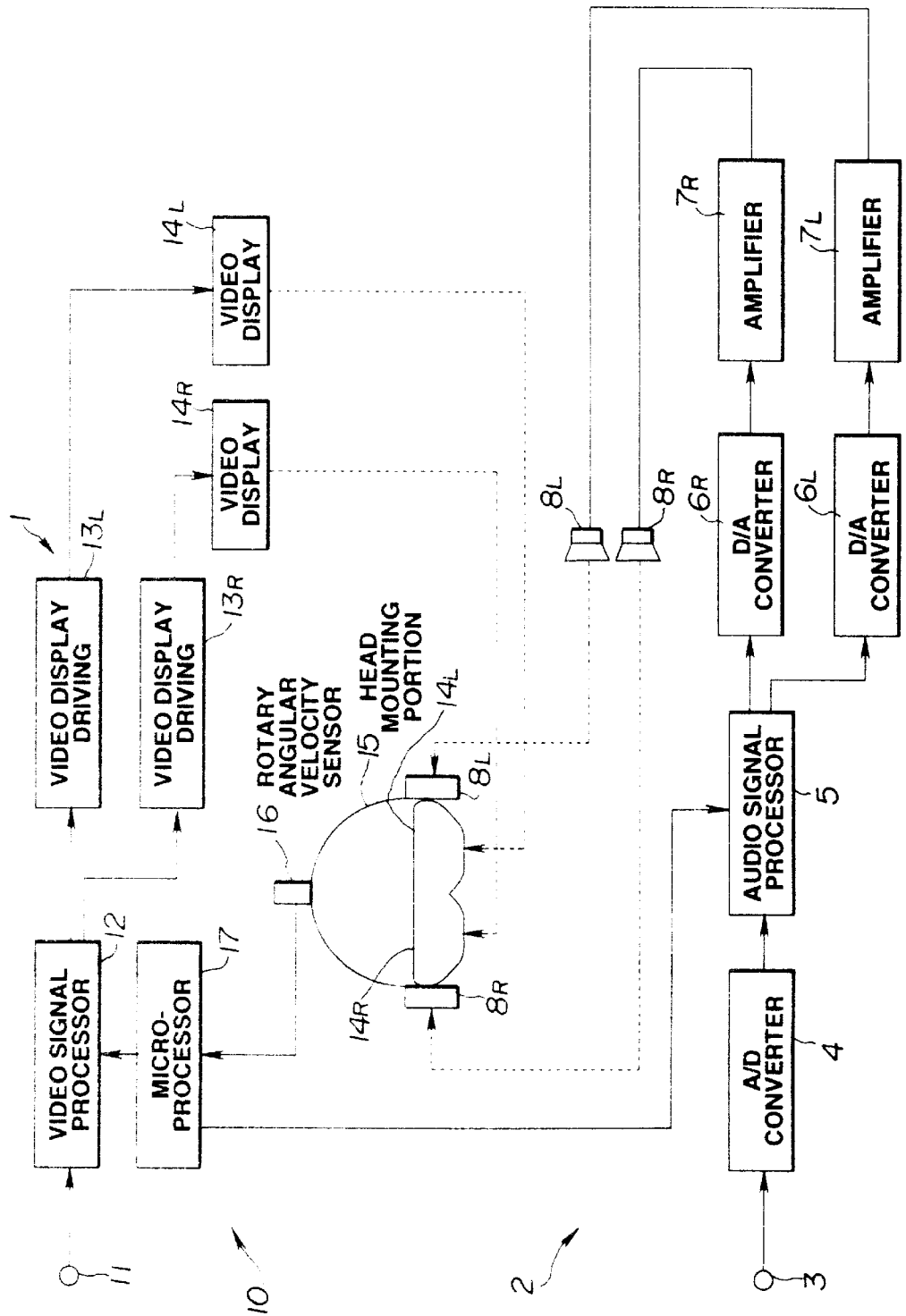
FIG. 3 is a schematic block diagram showing a first embodiment of an image audio reproducing apparatus according to the present invention.

The first embodiment of the present invention is a head attachment type image audio reproducing apparatus including an audio reproducing unit 2 for localizing the sound image outside the head for reproducing the audio corresponding to input audio signals, an image reproducing unit 10 for fixing a visual image in a pre-set direction for reproducing an input image, and a rotational angular velocity sensor 16 for detecting the head turning movement, as shown in FIG. 3. These units and sensor are integrally attached to a head attachment unit 15 in the form of a head band of a helmet.

The audio reproducing unit 2 has an audio signal processor 5 which executes calculations responsive to the results of detection by the rotational angular velocity sensor 16 to cause the sound image of the audio corresponding to the input audio signal to be localized outside the head of the user wearing the head attachment unit 15 and to prevent the sound image direction from following the head turning movement in order to set the sound image direction in a pre-set direction in the viewing/hearing environment. The audio signals entering an audio signal input terminal 3 is converted by an A/D converter 4 into digital signals before being supplied to the audio signal processor 5. An output of the audio signal processor 5 is supplied to D/A converters $6_L$, $6_R$ associated with left and right ears, respectively. The audio signals, converted by the D/A converters $6_L$, $6_R$ into analog signals, are supplied via headphone driving amplifiers $7_L$, $7_R$, associated with left and right ears, respectively, to a speaker for left ear $8_L$ and a speaker for right ear $8_R$, provided in proximity to the left and right ears, respectively. The speaker for left ear $8_L$ and the speaker for right ear $8_R$ emit the audio corresponding to the amplified audio signals.

The image reproducing unit 10 has an image signal processor 12 for setting the input image in a pre-set direction in the viewing environment of the user of the head attachment unit 15 responsive to the results of detection of the rotational angular velocity sensor 16. The image signal entering the image signal input terminal 11 is supplied to the image signal processor 12. The image signal processed by the image signal processor 12 is supplied via image display driving units $13_L$, $13_R$ to an image display unit for left eye $14_L$ and to an image display unit for the right eye $14_R$ arranged in the vicinity of the left and right eyes, respectively.

The rotational angular velocity sensor 16 detects the turning angular velocity of the head of the user of the head attachment unit 15 and sends the results of detection to a microprocessor 17. The micro-processor 17 calculates the angle of the turning movement of the user of the head attachment unit 15 from the front direction and sends the results of calculations to the audio signal processor 5 and the image signal processor 12.

Figure 4:
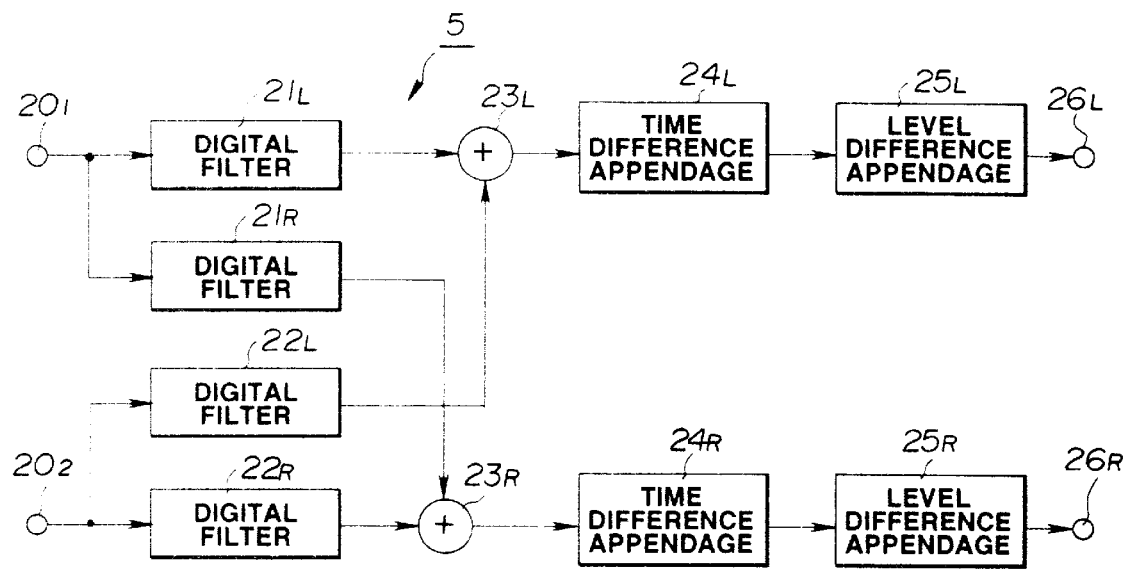
FIG. 4 is a block diagram showing a detailed structure of a audio signal processor employed in the first embodiment.

Referring to FIG. 4, the audio signal processor 5 has four digital filters $21_L$, $21_R$, $22_L$, $22_R$ for convolving the impulse response employing the transfer function from the two actual sound sources to both ears of the user of the headphone attachment unit 15 to two-channel input audio signals received via input terminals $20_1$, $20_2$, and a pair of adders $23_L$, $23_R$ for adding the same L and R sign outputs of the two channels. The audio signal processor 5 also includes a pair of time difference addition circuits $24_L$, $24_R$, connected to the adders $23_L$, $23_R$, respectively, and a pair of level difference addition circuits $25_L$, $25_R$ connected to the time difference addition circuits $24_L$, $24_R$, respectively. The audio signal processor 5 is responsive to the turning angle produced by the turning angular velocity sensor 16 and the micro-processor 17 to reverse the increasing/decreasing direction of the time difference and level difference to be added by the time difference addition circuits $24_L$, $24_R$ and by the level difference addition circuits $25_L$, $25_R$, respectively.

Figure 5:
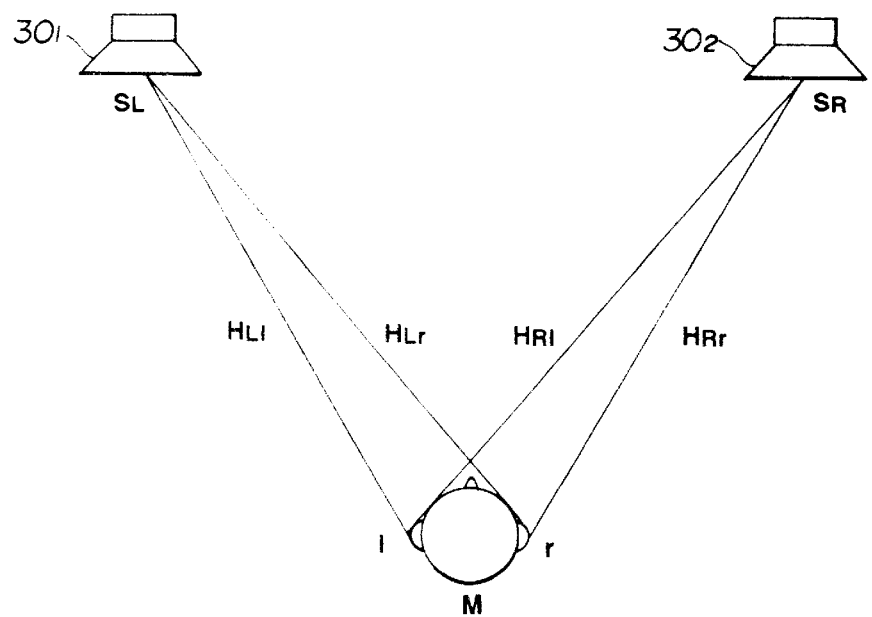
FIG. 5 is a schematic view showing a viewing/hearing environment presupposed by the audio signal processor employed in the first embodiment.

Specifically, the audio signal processor 5 routes audio signals to the speakers $8_L$, $8_R$ under assumed conditions as shown in FIG. 5. That is, the two channels from sound sources $30_1$, $30_2$ have been considered so that the input audio signals will be localized in a forward range of 180.

On the digital audio signals entering the input terminals $20_1$, $20_2$, the impulse response corresponding to the transfer function to both ears of the user from the sound sources $30_1$, $30_2$ corresponding to localization in a pre-set forward direction in the initial state is convolved by the digital filters $21_L$, $21_R$, $22_L$, $22_R$. The L-side outputs are summed by the adder $23_L$ so as to be outputted via time difference addition circuit $24_L$ and level difference addition circuit $25_L$ at an output terminal $26_L$, while the R-side outputs are summed by the adder $23_R$ so as to be outputted via time difference addition circuit $24_R$ and level difference addition circuit $25_R$ at an output terminal $26_R$.

The transfer functions from the sound sources $30_1$, $30_2$ to both ears l, r of a listener M are assumed to be $H_{Ll}$, $H_{Lr}$, $H_{Rl}$, $H_{Rr}$ as shown in FIG. 5. The audio on which the impulse response has been convolved by the digital filters $21_L$, $21_R$, $22_L$, $22_R$ is supplied to both ears of the listener M by the speaker for left ear $8_L$ and the speaker for right ear $8_R$ so that $S_L H_{Ll} + S_R H_{Rl}$ and $S_R H_{Rr} + S_L H_{Lr}$ will be supplied to the left ear l and to the right ear r, wherein $S_L$, $S_R$ denote the signals outputted by the respective speakers of the L and R channels, respectively.

If the listener M turns his or her head towards left, the left ear l is moved away from the sound sources $30_1$, $30_2$, while the right ear r approaches the sound sources $30_1$, $30_2$. The result is that the time difference and the level difference are produced in the input audio signals reaching the left ear l and the right ear r. It is the time difference addition circuits $24_L$, $24_R$ and the level difference addition circuits $25_L$, $25_R$ that produce the time difference and the level difference, respectively.

Figure 6:
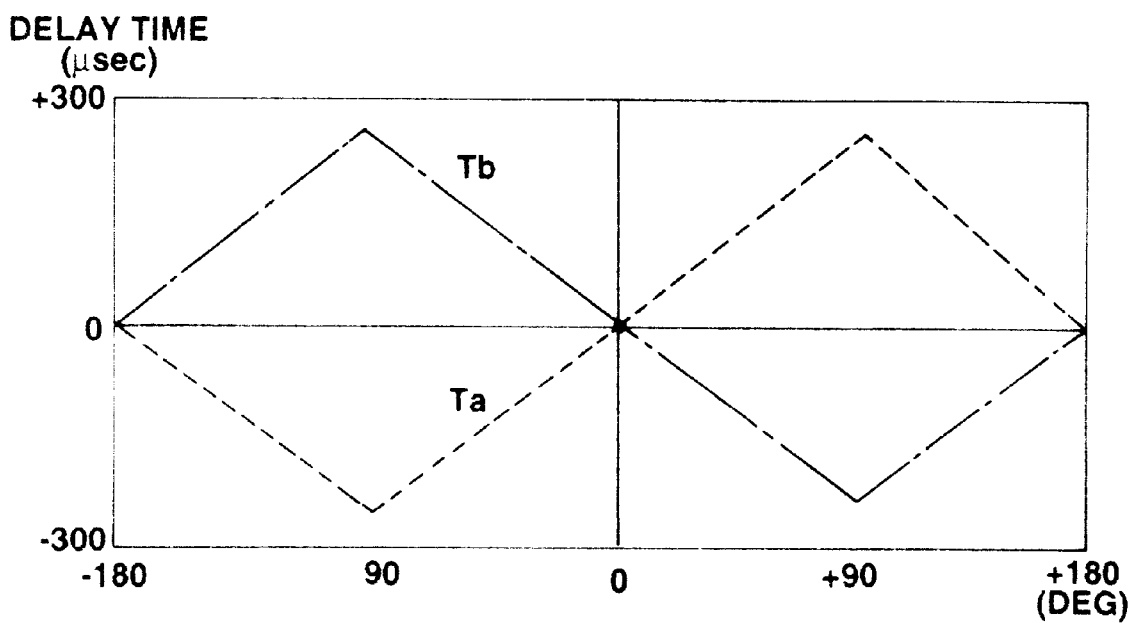
FIG. 6 is a graph for illustrating the delay time added by a time difference addition circuit of an audio signal processor employed in the first embodiment.

The delay time added by the L-side time difference addition circuit $24_L$ and the delay time added by the R-side time difference addition circuit $24_R$ are denoted by chain-dotted delay time characteristic curves $T_b$ and $T_a$ in FIG. 6, respectively. The characteristic curves $T_a$, $T_b$ increase or decrease in the totally opposite directions with respect to the turning direction of the head of the listener M. The result is that time changes from the sound source to both ears of the listener M, which are similar to those when the listener hears the sound from a sound source placed with in a forward range of 180. as he or she turns his or her head in the left and right direction, are added to the signal entering the input terminals $20_1$, $20_2$.

Figure 7:
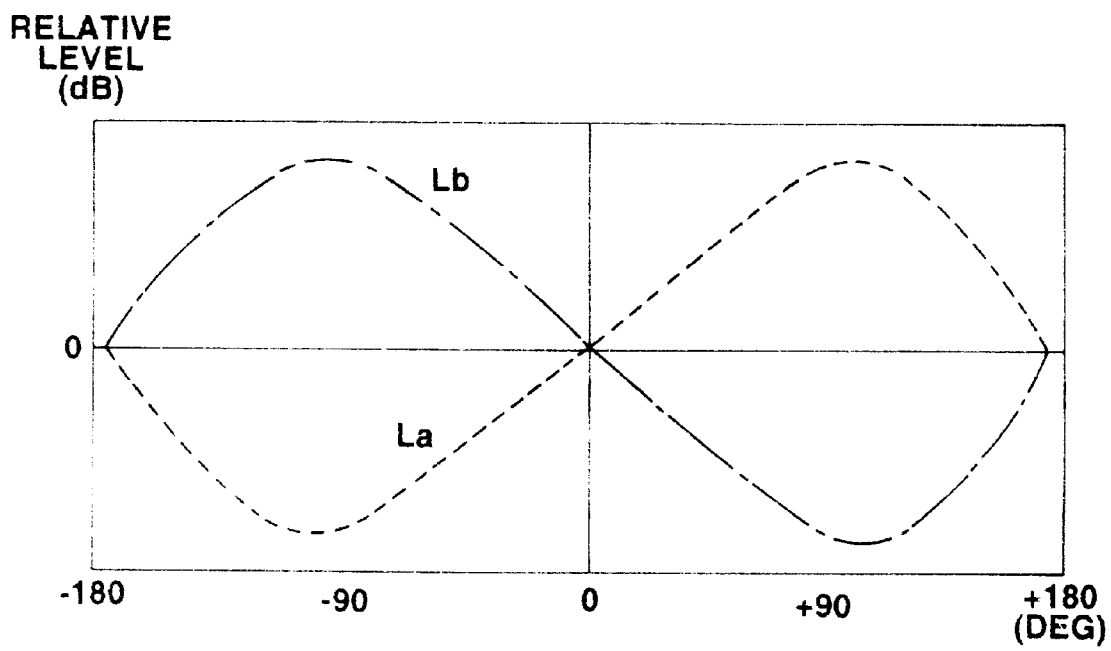
FIG. 7 is a graph showing the level difference added by a level difference addition circuit of the audio signal processor employed in the first embodiment.

In FIG. 7, showing the relative level from the state of the 0° head turning angle, the level difference added by the L-side level difference addition circuit $25_L$ is denoted by a broken-line relative level characteristic curve La, while the level difference added by the R-side level difference addition circuit $25_R$ is denoted by a chain-dotted-line relative level characteristic curve Lb. It is seen that the characteristic curves La and Lb increase or decrease in the totally opposite direction with respect to the head turning angle of the listener M. Since the level difference addition circuits $25_L$ and the level difference addition circuits $25_R$ add level changes of the characteristic curves La and Lb, respectively, sound volume changes similar to those when the listener M actually hears the forward sound source are added to the input signals transmitted from the input terminals $20_1$, $20_2$.

It is seen from the above that audio signals reproduced by the audio reproducing unit 2 are varied in a similar manner to that when the listener M hears the actual audio as he or she turns his or her head, so that the sound image may be localized in a pre-set direction, inclusive of the directly forward direction, which is outside the head of the listener in the viewing/hearing environment. If plural audio signals of two or more channels are used, stereophonic sound field reproduction, in which a sound image is localized at an arbitrary position, may be achieved.

Figure 8:
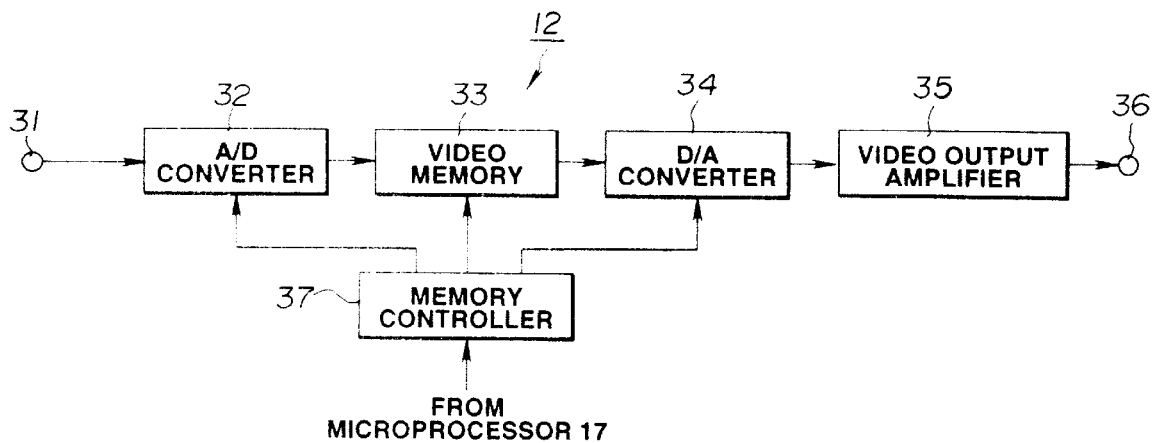
FIG. 8 is a block diagram showing a detailed structure of a video signal processor employed in the first embodiment.

Referring to FIG. 8, the video signal processor 12 encodes video input signals, received via an input terminal 31, into digital signals by an A/D converter 32, stores the encoded signals in an image memory 33, and causes the image display position to be varied depending on the head turning angle.

The storage addresses of the image data, as encoded image signals, in the image memory 33, are determined by a memory controller 37 responsive to the angle of turning movement as calculated by the micro-processor 17. Thus the image memory 33 seizes the image data as a portion of a display area. In the image memory 33 in which no image data is seized, data representing a black color or other pre-set colors are stored. The image data is converted by a D/A converter 34 into analog signals as image signals displaying the image memory 33 in its entirety. These image signals are supplied at a terminal 36 via an image output amplifier 35 to image display driving units $13_L$, $13_R$ shown in FIG. 3. An image corresponding to the image signals is displayed in image display units $14_L$, $14_R$. The result is that the image data arraying position on the image memory 33 is changed responsive to the head turning angle for displaying an image set in a pre-set direction in the viewing/hearing environment on the image display units $14_L$, $14_R$ arranged in the vicinity of the forward sides of both eyes of the viewer.

Figure 9:
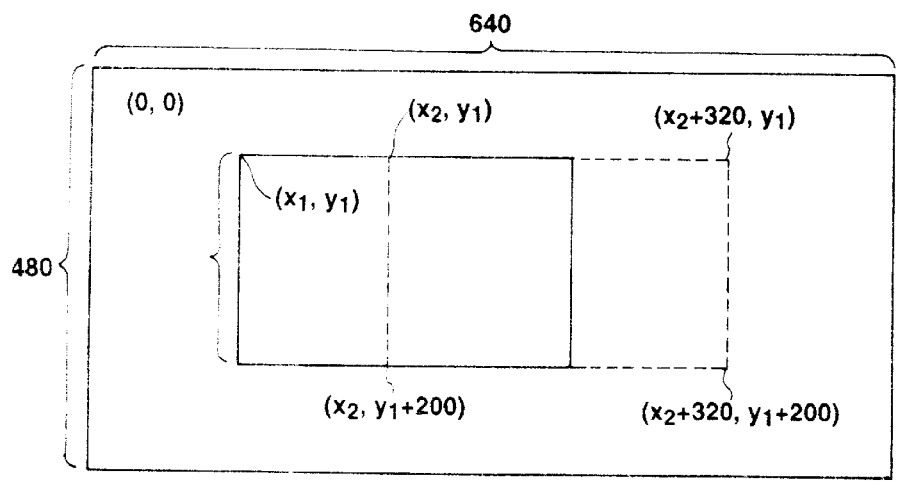
FIG. 9 is a diagrammatic view for illustrating a display area of a video reproducing unit employed in the first embodiment.

The display areas of the image display units $14_L$, $14_R$ are configured as shown in FIG. 9. Specifically, each display area is made up of 640×640 dots, each dot being associated with an independent storage area in the image memory 33. The storage capacity secured for each dot is determined as a function of bit lengths of digital signals, color display or non-color display, and so forth.

It is now assumed that image data in the display area is displayed in a limited manner with resolution of 320×200 dots. The coordinate at the left upper corner of the display area is (0, 0) and the coordinate at the left upper corner of the limited display area is ($x_1$, $y_1$). If the head is turned towards the left, and the image is to remain at a pre-set position in the viewing/hearing environment, the image position needs to be moved toward right in the limited display area, that is, to ($x_2$, $y_1$), where $x_2>x_1$, in order for the image to remain at a pre-set position in the viewing/hearing environment. The displacement $x_2-x_1$ is determined by the head turning angle θ (rad) and a distance r from the center of head rotation to the display device and, if θ is small, the displacement is roughly determined by $x_2-x_1=r\theta$. In order to effect such movement, the memory controller 37 causes the storage position of the image data to be an area in the image memory 33 delimited by coordinates ($x_2$, $y_1$), ($x_2$, $y_1+200$), ($x_2+320$, $y_1+320$), ($x_2+320$, $y_1$).

With the above-described first embodiment of the head attachment type image audio reproducing apparatus 1, the audio signal processor 5 and the image signal processor 12 perform signal processing, depending on the angle of head turning movement as calculated by the micro-processor 17, so that the position of sound image localization and the visual image position will be maintained in a pre-set direction outside the head within the viewing/hearing environment. The result is that overlapping of the position of sound image localization and the visual image position and resulting alien feeling as encountered in the conventional system may be eliminated and the source of audio enunciation of the image displayed on the display device may be in coincidence at all times with the actual sound image position. By synergistic effects of the image and the audio, more definite sound image localization may be achieved than is possible with reproduction of the audio only thus achieving realistic image audio reproduction.

Figure 10:
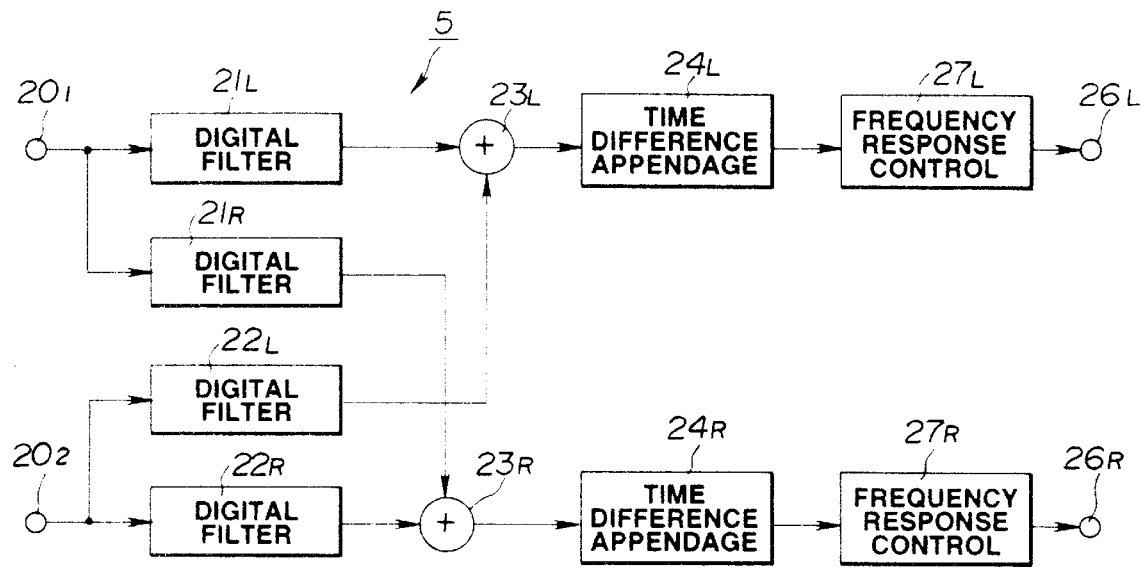
FIG. 10 is a block diagram showing the audio signal processor comprised of a time difference addition circuit and a frequency response control circuit.
Figure 12:
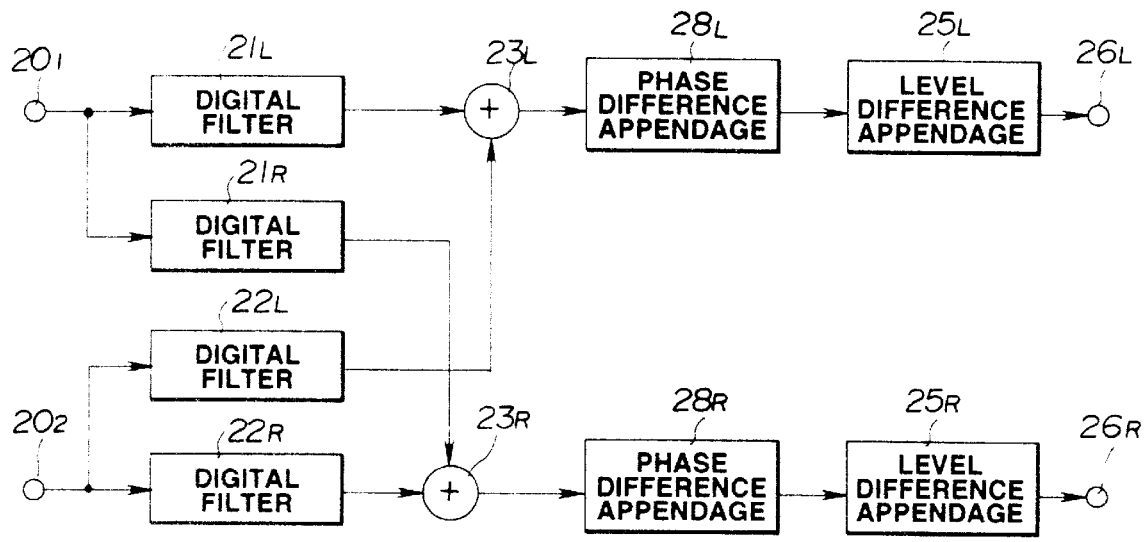
FIG. 12 is a block diagram showing the audio signal processor comprised of a phase difference addition circuit and a level difference addition circuit.
Figure 14:
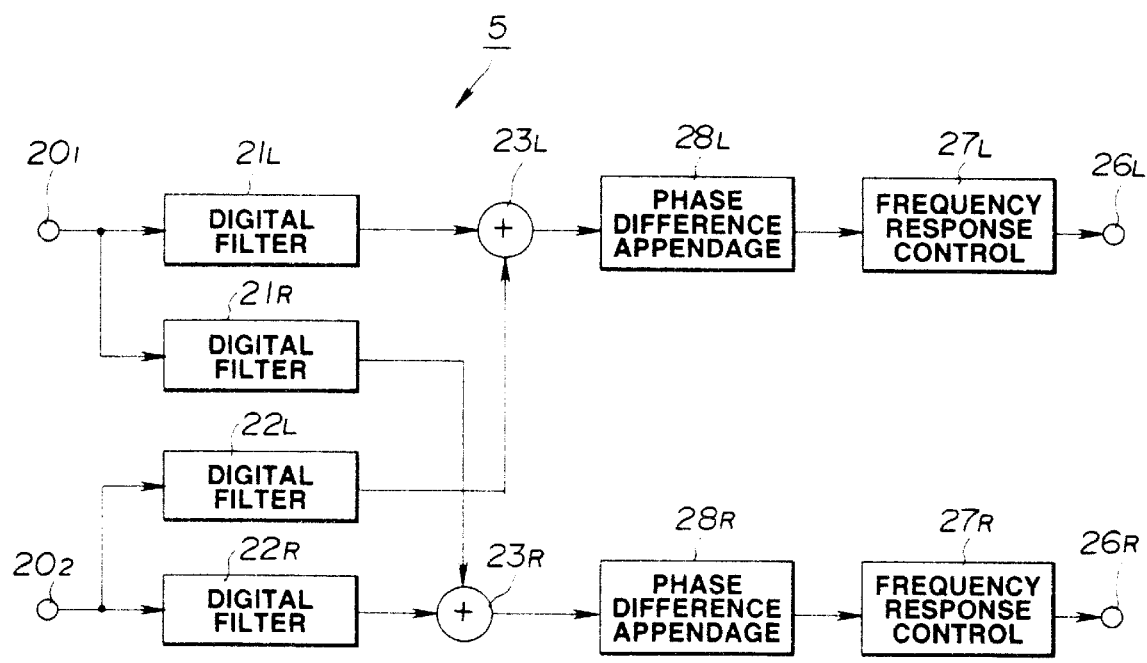
FIG. 14 is a block diagram showing the audio signal processor comprised of a phase difference addition circuit and a frequency response control circuit.

With the head attachment image audio reproducing apparatus 1, the audio signal processing unit 5 of the audio reproducing unit 2 may be configured as shown in FIGS. 10, 12 and 14.

The audio signal processor 5 shown in FIG. 10 has a pair of frequency response control circuits $27_L$, 27R connected to output sides of the time difference addition circuits $24_L$, $24_R$. These frequency response control circuits $27_L$, 27R replace the level difference addition circuits $25_L$, $25_R$ shown in FIG. 4.

Figure 11:
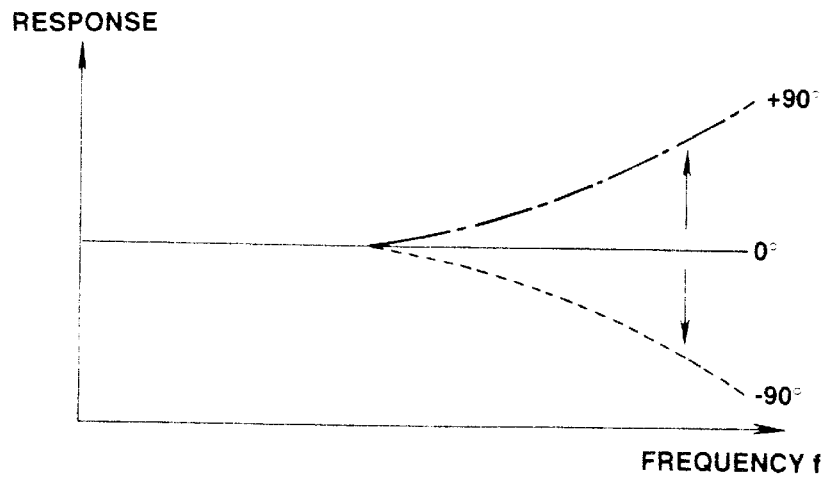
FIG. 11 is a graph for illustrating frequency control performed by the frequency response control circuit.

The frequency response control circuits $27_L$, 27R give the frequency response shown in FIG. 11 to the input signals, depending on the head turning angle of the wearer of the head attachment unit for controlling the frequency response. If the head is set towards the directly forward side, designated by 0°, the frequency response remains constant with increase in frequency f, as indicated by a solid line. However, if the head is turned 90° towards right or towards the left, there is produced a difference in response with increase in frequency f. If the head is turned 90° towards right (denoted by +90°), the response is increased with rise in frequency f as indicated by a chain-dotted line. On the contrary, if the head is turned 90° towards the left (denoted by −90°), the response is decreased with rise in frequency f as indicated by a broken line. These two response lines are vertically symmetrical about the response for the head set towards the front, as indicated by a solid line.

Thus the audio signal processor 5 shown in FIG. 10 adds the time difference by the time difference addition circuits $24_L$, $24_R$ to the input signal from the two sound sources of the two forward channels in a reversed increasing/decreasing direction responsive to the head turning angle, while reversing the changing direction of the frequency response controlled by the frequency response control circuits $27_L$, 27R depending on the head turning angle, thereby realizing the time difference between the two ears and frequency response for the forward audio signals equivalent to those when the actual sound source corresponding to the forward audio signals is heard as the listener turns his or her head. The result is the optimum outside-head sound-field localization in all directions.

With the audio signal processor 5 shown in FIG. 12, a pair of phase difference addition circuits $28_L$, $28_R$, in place of the time difference addition circuits $24_L$, $24_R$ shown in FIG. 4, are connected to the input sides of the level difference addition circuits $25_L$, $25_R$, respectively.

Figure 13:
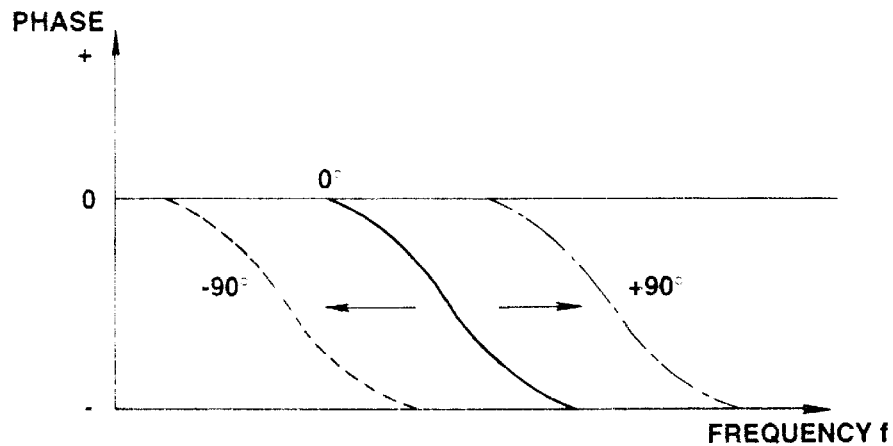
FIG. 13 is a graph for illustrating the phase difference added by the phase difference addition circuit.

The phase difference addition circuits $28_L$, $28_R$ give the phase difference, corresponding to phase change characteristics shown in FIG. 13, to the input signal depending on the head turning angle of the user. If the head remains fixed in the forward front direction (indicated 0°), a phase difference θ is produced, as indicated by a solid line. If, however, the head is turned towards right or left by 90°, the phase is shifted towards the left or right. Specifically, if the head is turned towards the right by 90°. (+90°), the phase is advanced, as indicated by a chain-dotted line. Conversely, if the head is turned towards the left by 90° (−90°), the phase is delayed, as indicated by a broken line.

Thus the audio signal processor 5 shown in FIG. 12 adds the phase difference by the phase difference addition circuits $28_L$, $28_R$ to the input signal from the two sound sources of the two forward channels in a reversed phase-difference increasing/decreasing direction responsive to the head turning angle, while reversing the changing direction of the level difference added by the level difference addition circuits $25_L$, 25R depending on the head turning angle, thereby realizing the phase difference and level difference characteristics between the two ears for the forward audio signals which are equivalent to those when the actual sound source corresponding to the forward audio signals is heard as the listener turns his or her head. The result is the optimum outside-head sound-field localization in all directions.

With the audio signal processor 5 shown in FIG. 14, a pair of phase difference addition circuits $28_L$, $28_R$, in place of the time difference addition circuits $24_L$, $24_R$ shown in FIG. 4, are connected to the input sides of a pair of frequency response control circuits $27_L$, 27R, respectively.

The phase difference addition circuits $28_L$, $28_R$ give the phase difference, corresponding to phase change characteristics shown in FIG. 13, to the input signal depending on the head turning angle of the user.

The frequency response control circuits $27_L$, 27R give the frequency response shown in FIG. 11 to the input signals depending on the head turning angle of the user for controlling the frequency response.

Thus the audio signal processor 5 shown in FIG. 14 adds the phase difference by the first phase difference addition circuits $28_L$, $28_R$ and the second phase difference addition circuits $31_L$, $31_R$ to the input signal from the two sound sources of the two forward channels in a reversed increasing/decreasing direction responsive to the head turning angle, while reversing the changing direction of the frequency response controlled by the first frequency response control circuits $28_L$, 28R and the second frequency response control circuits $29_L$, 29R depending on the head turning angle, thereby realizing the phase difference between the two ears and frequency response for the forward audio signals which are equivalent to those when the actual sound source corresponding to the forward audio signals is heard as the listener turns his or her head. The result is the optimum outside-head sound-field localization in all directions.

Figure 15:
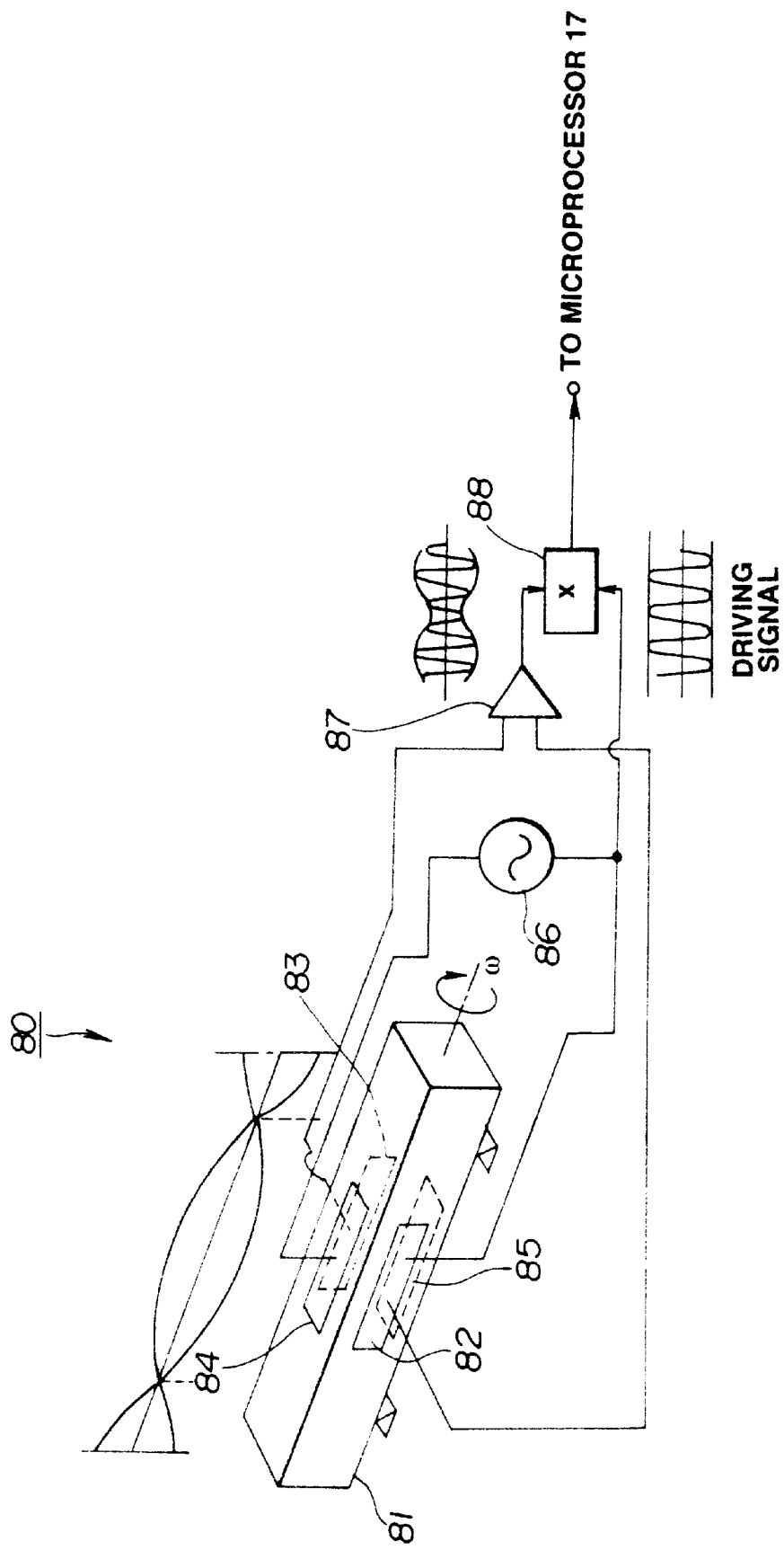
FIG. 15 is a schematic view showing a piezoelectric oscillation gyro device applicable to a rotational angular velocity sensor employed in the first embodiment.

The rotational angular velocity sensor 16 shown in FIG. 3 is now explained. The rotational angular velocity sensor 16 detects the turning angular velocity of the head of the wearer of the head attachment unit 15. In particular, the head attachment type image audio reproducing apparatus uses a piezoelectric oscillation gyro device 80 as a rotational angular velocity sensor 16. This piezoelectric oscillation gyro device 80 detects oscillating movements of a moving object by a piezoelectric element. In FIG. 15, the oscillation piezoelectric element 81, comprised of a square pillar having a square cross-section, is made up of a variety of oscillating members. On opposing surfaces of the piezoelectric element 81 are mounted piezoelectric elements for detection 82, 83 and piezoelectric elements for driving 84, 85.

The piezoelectric elements for driving 84, 85 are connected to a driving signal source 86 for supplying alternating signals. Outputs of the piezoelectric elements for detection 82, 83 are supplied to a differential amplifier 87. A differential output of the differential amplifier 87 and an output of the driving signal source 86 are supplied to a multiplier or a phase detector 88 for multiplication or phase detection. An output of the multiplier or the phase detector 88 is supplied to the micro-processor 17 shown in FIG. 3.

The above-described piezoelectric oscillation gyro device 80 operates as follows: If the piezoelectric elements for driving 84, 85 are fed with alternating signals of a natural oscillation frequency from the oscillation piezoelectric element 81, the oscillation piezoelectric element 81 is forced into oscillations based on the illustrated oscillation waveform. These oscillations produce resonant oscillations in a pre-set mode.

If no external force is exerted, no output is produced by the piezoelectric elements for detection 82, 83. However, if a rotary force having an angular velocity w is applied in an axial direction to the oscillation piezoelectric element 81, the alternating signals for forced oscillations, as a carrier, are modulated in amplitude by the Coriolis force and detected as a detection signal. The amplitude of the detection signal is proportionate to the angular velocity ω of rotation around the axis, with the direction of rotation corresponding to the direction of phase deviation of the detection signal with respect to the driving signal.

Thus it has been practiced to multiply the amplitude-modulated detection signal with the driving signal and the resulting product signal is passed through a band-limiting filter as a low-pass filter so as to be freed of carrier components to give a detection signal.

Figure 16:
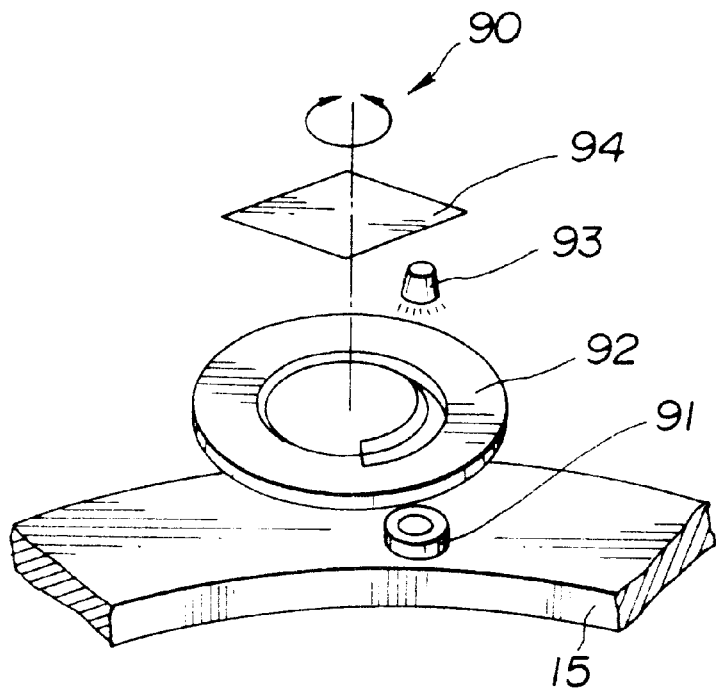
FIG. 16 is a schematic view showing an analog angular sensor applicable to a rotational angular velocity sensor employed in the first embodiment.

The rotational angular velocity sensor 16 may also be an analog angular sensor 90 as shown in FIG. 16. This analog angular sensor 90 is provided on the head attachment unit 15 for detecting head movement. With the analog angular sensor 90, a light receiver 91, comprised of a light receiving element, whose resistance is varied with the intensity of light, such as a CDS or a photodiode, is mounted at the center of the head attachment unit 15. A light emitter 93, such as an electric bulb or a LED, is mounted facing the light receiver 91 for radiating a light beam of a constant intensity to the light receiver 91.

On the light path of the light projected by the light emitter 93, there is mounted a movable shutter 92, the projected light of which is changed in transmittance with changes in the angle of rotation. This movable shutter 92 is adapted for being rotated with a magnetic needle 94. Thus, if a pre-set current is caused to flow in the light receiver 91, an analog output, indicating head movement inclusive of the direction of the user of the head attachment unit 15, is taken out as an electrical voltage across both ends of the light receiving element of the light receiver 91, with the S-N direction of the magnetic needle 94 as a reference direction.

Figure 17:
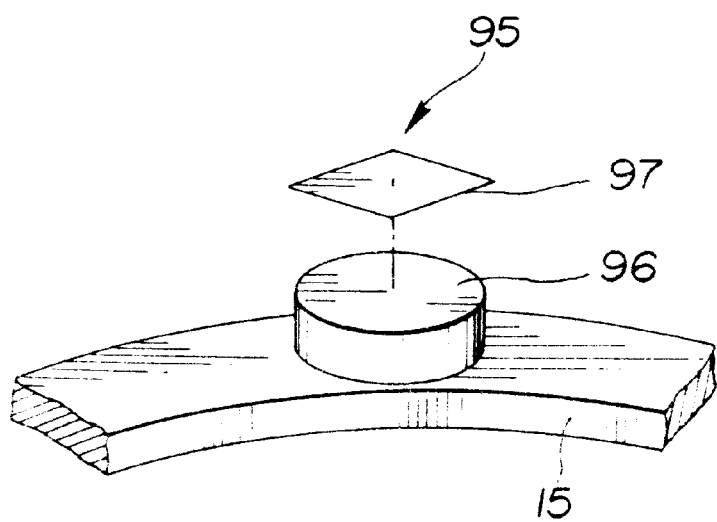
FIG. 17 is a schematic view showing a digital angular sensor applicable to a rotational angular velocity sensor employed in the first embodiment.

The rotational angular velocity sensor 16 may also be a digital angular sensor as shown in FIG. 17. This digital angular velocity sensor 95 is mounted on the head attachment unit 15 for detecting head movement. With the present digital angular sensor 95, a rotary encoder 96 is mounted within the head attachment unit 15 with its input axis extending vertically, while a magnetic needle 97 is mounted on the input axis. Thus an output indicating the head movement inclusive of the direction of the user of the head attachment unit 15, with the S-N direction of the magnetic needle 97 as a reference direction, is taken out at the rotary encoder 96.

The rotational angular velocity sensor 16 may also be configured for calculating the turning angle based on an output ratio of the light emitter placed on the front side or on the peripheral side and at least two light intensity sensors provided on the head attachment unit 15.

The rotational angular velocity sensor 16 may also be configured for reading a burst signal intermittently generated by an ultrasonic oscillator placed on the front or peripheral side by microphones provided at two places on the head attachment unit 15 spaced apart from each other, for calculating the turning angle from the time difference between the respective reception signals.

Figure 18:
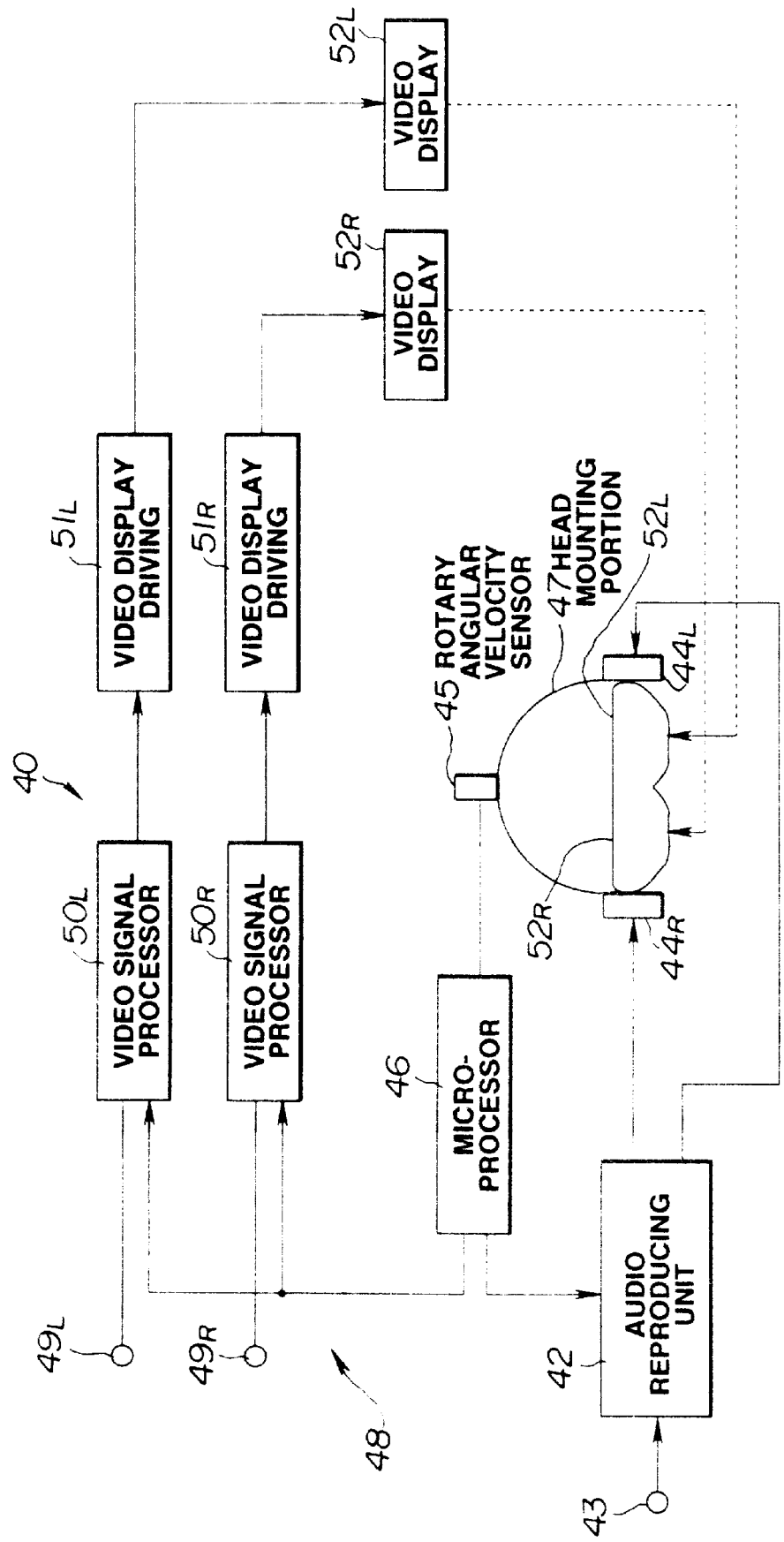
FIG. 18 is a schematic block circuit diagram showing the structure of a second embodiment of the image audio reproducing apparatus according to the present invention.

A second embodiment of the present invention will now be explained. This second embodiment, shown in FIG. 18, is a head attachment type image audio reproducing apparatus 40 comprised of an audio reproducing unit 42 for realizing an outside-head sound-image localization for reproducing an input audio, an image reproducing unit 48 for realizing setting of the image in a pre-set direction for reproducing the input image, and a rotational angular velocity sensor 45 for detecting the head turning movement. The audio reproducing unit 42, the image reproducing unit 48 and the head attachment unit 47 are integrally mounted on the head attachment unit 47 and the parallax is exploited for providing a three-dimensional image on the image reproducing unit 48.

The audio reproducing unit 42 is configured similarly to the audio reproducing unit 10 of the first embodiment. That is, the audio signal processor 5 is configured as shown in FIGS. 4, 10, 12 and 14, and input audio signals, supplied via an input terminal 43, are processed as described above and supplied via D/A converter and amplifier to speakers $44_L$, $44_R$.

Figure 19:
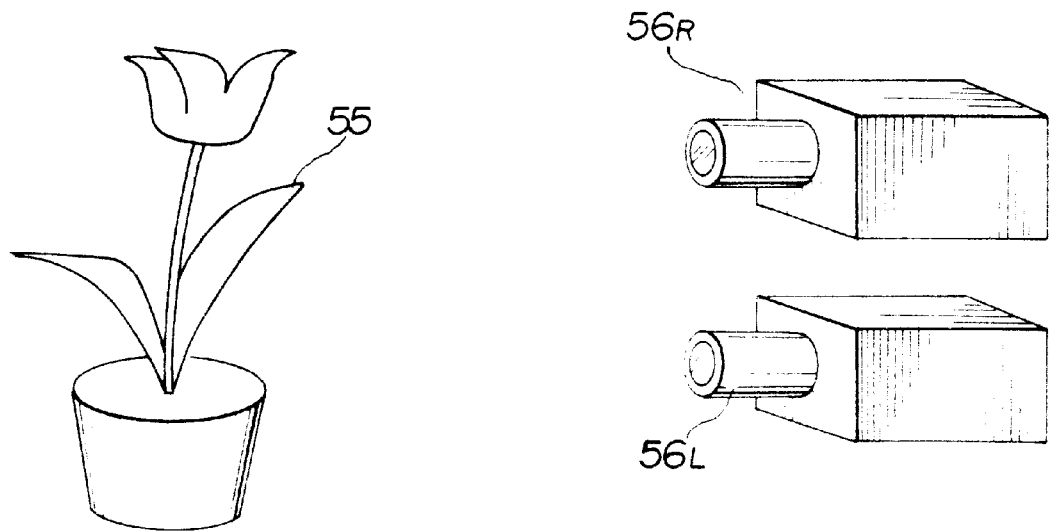
FIG. 19 is a schematic view for illustrating a video signal with parallax entering the apparatus of the second embodiment.

The image reproducing unit 48 is fed via input terminals $49_L$, $49_R$ with image signals for left eye and image signal for the right eye, which are produced for imaging the same object 55 with a left-eye camera $56_L$ and a right-eye camera $56_R$ and which suffer from parallax, as shown in FIG. 19. The image signals for the left eye are supplied to an image signal processor for the left eye $50_L$ so as to be set in a pre-set direction in the viewing/hearing environment responsive to the results of detection by the rotational angular velocity sensor 45. The image signals for the right eye are supplied to an image signal processor for the right eye $50_R$ so as to be set in a pre-set direction in the viewing/hearing environment responsive to the above results of detection. That is, the image signal processors $50_L$, $50_R$ cause the display positions of the image signals for the left and for the right eyes to be changed responsive to the head turning angle on the image display units $52_L$, $52_R$. If the head is turned towards the right, the synthesized frame position of the image signals for the left eye and the image signals for the right eye is shifted towards the left in the image display units $52_L$, $52_R$. Conversely, if the head is turned towards the left, the synthesized frame position is shifted towards the right in the image display units $52_L$, $52_R$. The result is that the image appears as if it were kept in a fixed orientation. Moreover, the image signals are perceived as a three-dimensional image with a far-and-near feeling because of parallax as described above.

The image signal processors $50_L$, $50_R$ are configured as described in connection with FIG. 8, while the display area in each of the image display units $52_L$, $52_R$ is similar to that shown in FIG. 7, although detailed description is not made for simplicity.

With the above-described second embodiment of the head attachment type image audio reproducing apparatus 40, the audio signal processor 5 and the image signal processors $50_L$, $50_R$ perform signal processing, depending on the angle of head turning movement as calculated by the micro-processor 46, so that the position of sound image localization and the image position subjected to parallax will be maintained in a pre-set direction outside the head within the viewing/hearing environment. The result is that overlapping of the position of sound image localization and the visual image position and resulting alien feeling as encountered in the conventional system may be eliminated and the source of audio enunciation of the image displayed on the display device may be in coincidence at all times with the actual sound image position. By synergistic effects of the image and the audio, more definite sound image localization may be achieved than is possible with reproduction of the audio only thus achieving realistic image audio reproduction.

A third embodiment of the present invention is now explained. The present third embodiment is configured similarly to the head attachment type image audio reproducing apparatus 1 shown in FIG. 3. However, the image signal processor 12 executes signal processing in such manner as to take out part of the image signals selectively.

That is, the contents displayed on the image display units $14_L$, $14_R$ are changed responsive to the head turning angle, as calculated by the micro-processor 17 from the rotational angular velocity detected by the rotational angular velocity sensor 16, as if these contents were fixed in a pre-set direction in the viewing/hearing environment.

Figure 20:
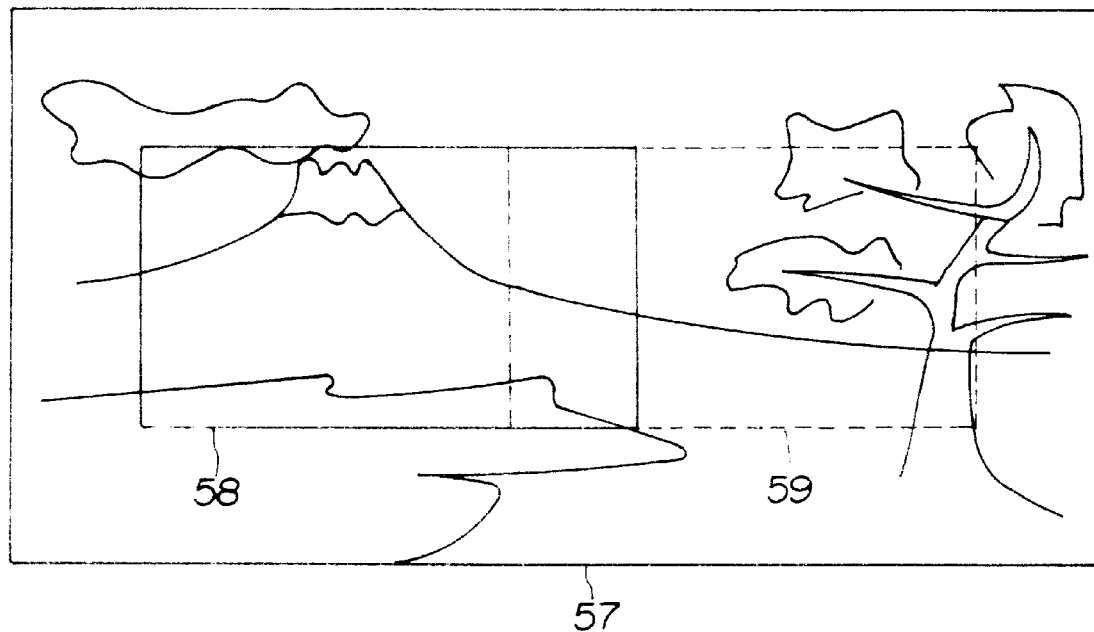
FIG. 20 is a schematic view for illustrating the operation of the operation of the video reproducing unit of the third embodiment.

The manner of selecting the image area in this manner is explained by referring to FIG. 20. Supposing that, after a display area 58 of a total display area 57 of the contents of the image signals is outputted in the initial state to the image display units $14_L$, $14_R$ by the image signal processor 12, the head of the user is turned to the right, the image signal processor 12 continuously outputs a display area 59, matched to the turning angle, to the image display units $14_L$, $14_R$. Conversely, if the head of the user is turned from this state towards the left, the display area is moved towards the display area 58.

The image signal processor 12 is configured similarly to the processor shown in FIG. 8. However, image data is stored in an entire area in the image memory 33, and part of the stored picture data is displayed as an actual display area, instead of storing the image data in a portion of the image memory 33 and such stored image is displayed.

The structure and the operation of the audio reproducing unit 2 is not explained since they are similar to those of the audio reproducing unit 2 shown in FIG. 1.

Since the image signal processor 12 causes the display contents to be kept in a pre-set orientation in the viewing/hearing environment, the present third embodiment assures the image audio reproduction coincident with audio.

Figure 21:
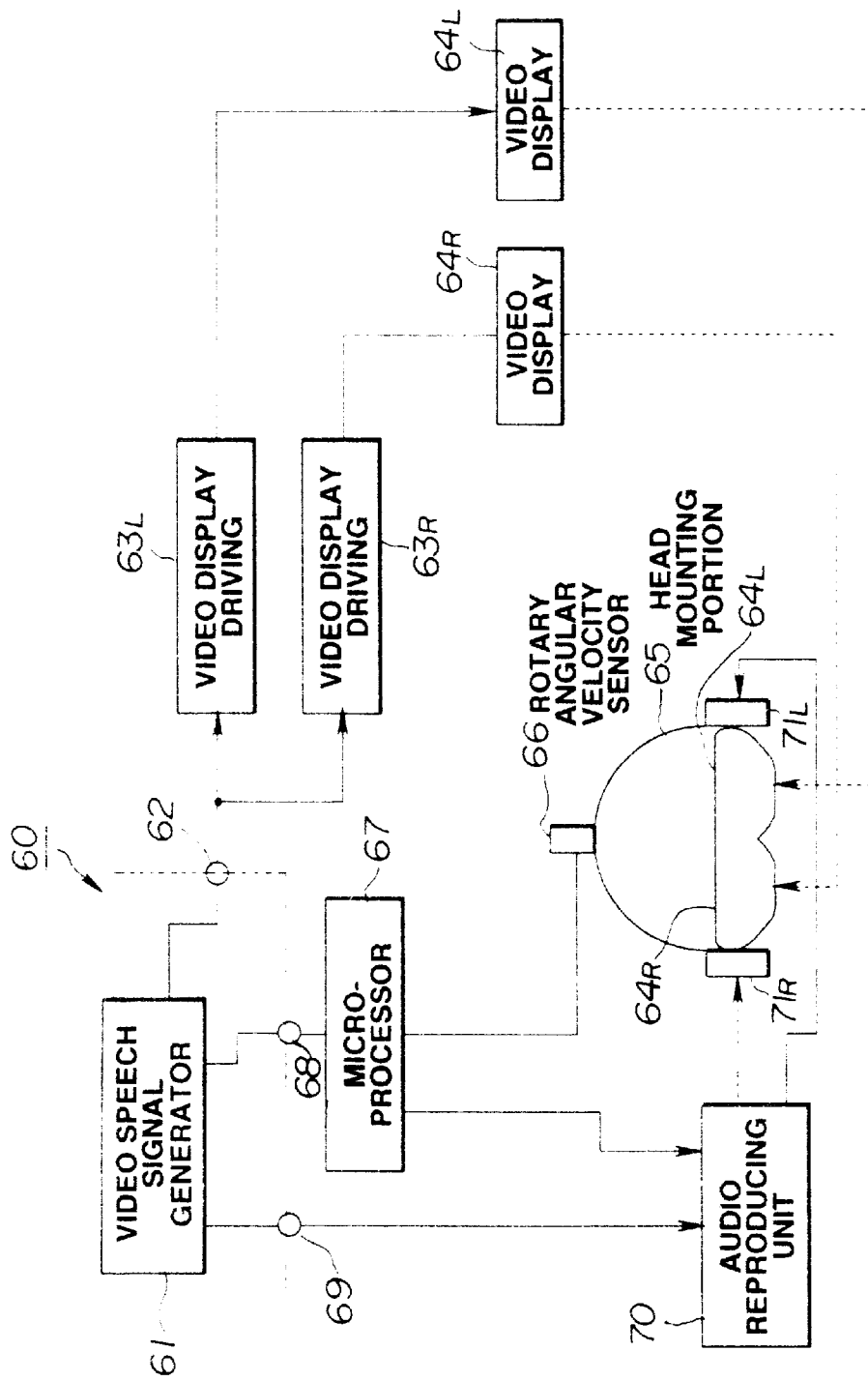
FIG. 21 is a schematic view for illustrating the fourth embodiment of the image audio reproducing apparatus according to the present invention.

A fourth embodiment of the present invention is now explained. The present fourth embodiment, shown in FIG. 21, is a head attachment type image audio reproducing apparatus in which the position information of the wearer of a head attachment unit 65 is supplied to an image audio signal generator 61 provided independently of the head attachment unit 65 and the image signal and the audio signal are outputted for fixedly setting the image audio environment responsive to such position information.

The head turning angle, detected by the rotational angular sensor 66 provided on the head attachment unit 65, is supplied to a micro-processor 67 where it is converted into a position information control signal. This position information control signal is sent via a position information output terminal 68 to the image audio signal generator 61.

The image audio signal generator 61 is advised of the position information of the wearer of the head attachment unit 65, responsive to the position information control signal, in order to update the contents of the image signal and the audio signal. The image audio signal generator 61 synthesizes the image signal by, for example, computer graphics, and outputs the synthesized image output. In addition, the image audio signal generator 61 stores the audio signals in a large-scale memory, and selectively extracts and outputs the audio signal from the large-scale memory. Thus the image audio signal generator 61 furnishes the image signal, updated responsive to the head position of the wearer of the head attachment unit 65 so as to be synthesized by the above-mentioned technique of computer graphics, via an image input terminal 62 to image display driving units $63_L$, $63_R$. The image audio signal generator 61 also furnishes the audio signals, updated responsive to the head position of the wearer of the head attachment unit 65 and selectively extracted from the large-scale memory, via an audio input terminal 69 to an audio reproducing unit 70.

The audio reproducing unit 70 executes audio signal processing, similar to that performed by the audio reproducing unit 1 of FIG. 1, on the audio signal, and sends the processed audio signal to speakers $71_L$, $71_R$ provided on the head attachment unit 65. Thus the audio signal is processed so that a sound image will be fixedly set at a pre-set position outside the head of the wearer responsive to the movement of his or her head. If plural audio signal are used, three-dimensional sound field reproduction may be achieved, in which plural sound images are localized at plural arbitrary positions.

The image display driving units $63_L$, $63_R$, to which the image signals are supplied via image input terminal 62, supply the image signals to image display units $64_L$, $64_R$ arranged on the head attachment unit 65 so as to be adjacent to both eyes of the wearer. The image display units $64_L$, $64_R$ display the image signal so that the contents will be fixed in the viewing/hearing environment. That is, if the head is turning towards the right, the image contents in which the image is panned towards the right may be produced. Conversely, if the head is turning towards the left, the image contents in which the image is panned towards the left may be produced. The result is that the display contents appear as if they were kept in a fixed orientation in the viewing/hearing environment.

With the present fourth embodiment of the head attachment type image audio reproducing apparatus 60, since the image and the audio are set so that the actual sound image is localized at a sound source in the image, with far-and-near feeling, thus achieving high-reality image audio reproduction.

A fifth embodiment of the present invention will now be explained. As in to the above-described third embodiment, the present fifth embodiment is similar to a head attachment type image audio reproducing apparatus 1 shown in FIG. 3. Thus the head attachment type image audio reproducing apparatus 1 performs image signal processing so that the image signal processor 12 selectively outputs part of the image signals and, if the display area reaches the limit of the contents of the image signals, the localized visual image and sound image are rotated in synchronism with head movement with respect to the viewing/hearing environment.

That is, if, after the image signal processor 12 has outputted the display area 58 of the total area 57 of image signal contents to the image display units $14_L$, $14_R$ in the initial state, the head of the wearer has turned to right, the image signal processor 12 continuously outputs the display area 59 matched to the turning angle to the image display units $14_L$, $14_R$. If, conversely, the head of the wearer has turned towards the left, beginning from the above state, the processor 12 outputs the display area 58.

Figure 22:
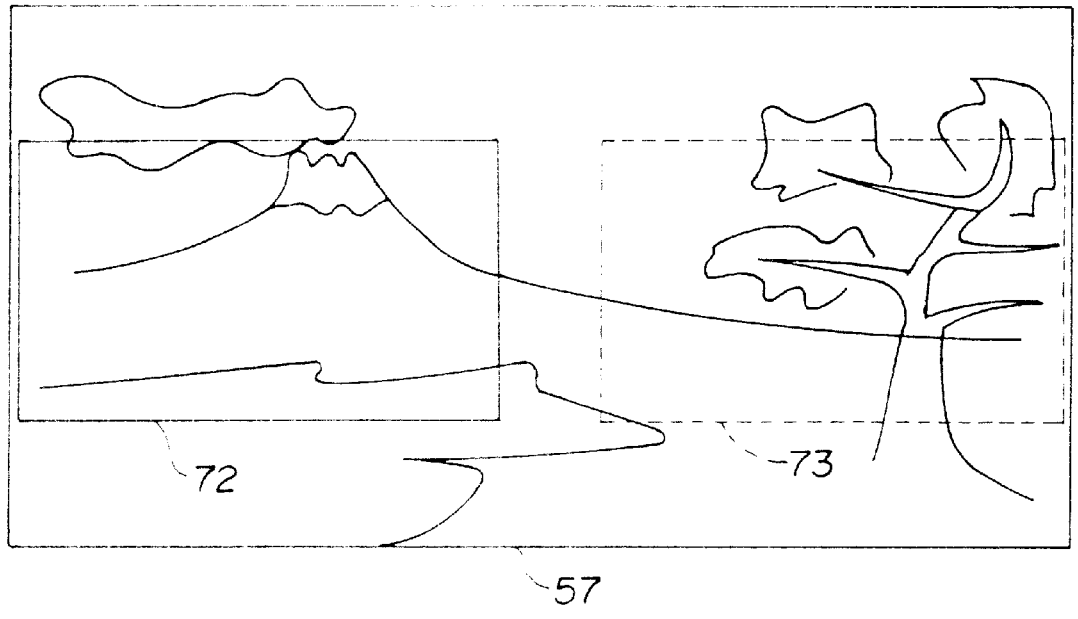
FIG. 22 is a schematic view for illustrating the operation of a video reproducing unit of a fifth embodiment of the image audio reproducing apparatus according to the present invention.

If the display area 85 has reached the limit of the total area of the image signal contents 57, as shown in FIG. 22, the localized positions of the visual image and the sound image are rotated relative to the viewing/hearing environment, that is, fixed relative to the head, at the time point of the display area 85 reaching the limit, in synchronism with head movement, so that the display area becomes the motion display area 87. If the head has turned in this state in the reverse direction, both the visual image and the sound image become fixed with respect to the viewing/hearing environment, so long as the total area of the image signal contents permits.

Figure 23:
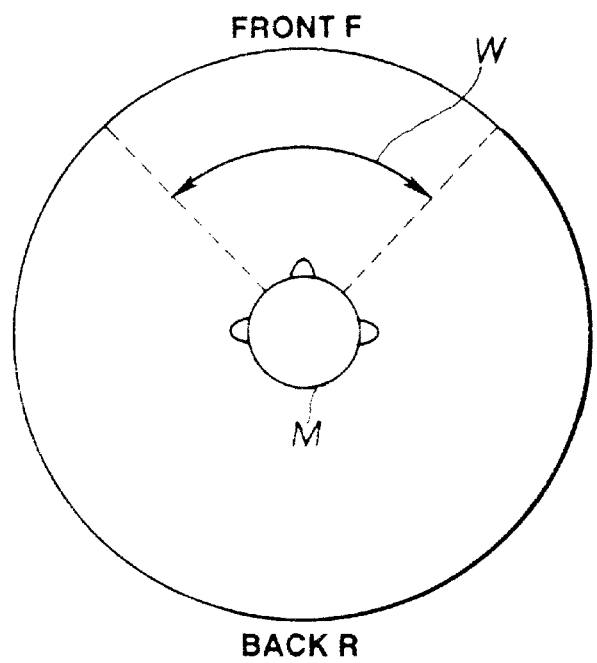
FIG. 23 is a schematic view for illustrating the operation of the fifth embodiment.

If the viewer attaches the apparatus of the fifth embodiment to enjoy the software such as an existing motion picture, it is unnecessary for the visual image and the sound image to be fixed in an entire range. If, for example, the image position is fixed in a pre-set range W forwardly of the listener M, as shown in FIG. 23, the visual image position and the sound image position are fixed in a practically acceptable range W. Within this range W, the display contents appear to be fixed in a pre-set orientation in the viewing/hearing environment, thus enabling image audio reproduction with the visual image and the sound image coincident with each other in orientation. The time difference and the level difference of the audio signal between both ears produced by head movement are also added as when the listener hears the real sound source, so that the sound image can be localized outside the head in a direction inclusive of the directly forward direction.

The audio input signal may also be supplied over a radio path to the audio reproducing unit on the head attachment unit, while the image input signal may be supplied over a radio path to the image reproducing unit on the head attachment unit.

We claim:

1. An image and audio reproducing apparatus comprising:
   head attaching means for mounting on the head of a user;
   audio reproducing means mounted on said head attaching means for reproducing an audio signal and outputting to the user a sound from a loudspeaker based on said reproducing audio signal;
   image reproducing means mounted on said head attaching means for reproducing an image signal and displaying a picture based on said reproduced image signal; and
   turning angle detecting means for detecting a turning angle at which said user wearing said head attaching means turns his/her head,
   wherein said audio reproducing means includes an audio signal processing means for localizing said sound outside said head and for preventing a direction of said sound from following a head turning movement and for fixing said direction of said sound in a predetermined direction in a viewing/hearing environment, and further wherein
   said image reproducing means includes an image signal processing means for fixing a picture perception position in a predetermined direction in said viewing/hearing environment according to said head turning movement, and
   wherein said audio reproducing means fixes said direction of said sound in said predetermined direction when said turning angle detected by said turning angle detecting means is within a predetermined angular range, said audio signal processing means processes said audio signal to have said direction of said sound move synchronously with said head turning movement when said turning angle detected by said turning angle detecting means is outside of said predetermined angular range, and said image reproducing means processes said image signal to have said direction of said picture perception position move synchronously with said head turning movement when said turning angle detected by said turning angle detecting means is outside of said predetermined angular range.

2. The image and audio reproducing apparatus comprising:

head attaching means for mounting on the head of a user;

audio reproducing means mounted on said head attaching means for reproducing an audio signal and outputting to the user a sound from a loudspeaker based on said reproducing audio signal;

image reproducing means mounted on said head attaching means for reproducing an image signal and displaying a picture based on said reproduced image signal; and turning angle detecting means for detecting a turning angle at which said user wearing said head attaching means turns his/her head, wherein said audio reproducing means includes an audio signal processing means for localizing said sound outside said head and for preventing a direction of said sound from following a head turning movement and for fixing said direction of said sound in a predetermined direction in a viewing/hearing environment, and further wherein said image reproducing means includes an image signal processing means for fixing a picture perception position in a predetermined direction in said viewing/hearing environment according to said head turning movement, and wherein said audio reproducing means and said image reproducing means respectively fix said direction of said sound and said direction of said picture in said predetermined direction when said turning angle detected by said turning angle detecting means is within a predetermined angular range, said audio signal processing means processes said audio signal to have said direction of said sound move synchronously with said head turning movement and said image reproducing means processes said image signal to have said direction of said picture perception position move synchronously with said head turning movement when said turning angle detected by said turning angle detecting means is outside of said predetermined angular range.

3. The image and audio reproducing apparatus according to claims 1 or 2, wherein said image reproducing means respectively displays a different picture for viewing by each eye of the user.

4. The image and audio reproducing apparatus according to claims 1 or 2, wherein said image reproducing means selectively displays a portion of said image signal according to said turning angle detected by said turning angle detecting means.

5. The image and audio reproducing apparatus according to claims 1 or 2, further comprising position correcting means for correcting a position of said sound to a predetermined position determined by a position of the user's head, said position detecting means being mounted on said head attaching means with said turning angle detecting means.

6. The image and audio reproducing apparatus according to claim 5, wherein said position detecting means calculates said position of the user's head based on a ratio between an output of light emitting means located proximate said turning angle detecting means and outputs of at least two light intensity sensors provided on said head attaching means.

7. The image and audio reproducing apparatus according to claim 5, wherein said turning angle detecting means and said position detecting means respectively calculate said turning angle and said position of said head based on a ratio between an output of light emitting means located proximate said turning angle detecting means and outputs of at least two light intensity sensors provided on said head attaching means.

8. The image and audio reproducing apparatus according to claims 1 or 2, wherein a piezoelectric oscillation gyro operating as an angular velocity sensor is included in said turning angle detecting means.

9. The image and audio reproducing apparatus according to claims 1 or 2, wherein a geomagnetic azimuth sensor is included in said turning angle detecting means.

10. The image and audio reproducing apparatus according to claims 1 or 2, wherein said turning angle detecting means calculates said turning angle based on a ratio between an output of light emitting means located proximate said turning angle detecting means and outputs of at least two light intensity sensors provided on said head attaching means.

11. The image and audio reproducing apparatus according to claims 1 or 2, further comprising wireless means whereby said audio signal is supplied to said audio reproducing means provided on said head attaching means.

12. The image and audio reproducing apparatus according to claims 1 or 2, further comprising wireless means whereby said image signal is supplied to said image reproducing means provided on said head attaching means.

13. An image and audio reproducing apparatus comprising:

a head attaching means for attaching to the head of a user;

audio reproducing means mounted on said head attaching means for reproducing an audio signal and outputting a sound to the user from a loudspeaker based on said reproduced audio signal;

image reproducing means mounted on said head attaching means for reproducing an image signal and displaying a picture to the user based on said reproduced image signal; and turning angle detecting means for detecting a turning angle at which said user wearing said head attaching means and said image and audio reproducing apparatus turns his/her head;

wherein said audio reproducing means includes audio signal processing means for adding one of a time difference, a phase difference, a level difference, and a frequency response to an output of each of two digital filters included in said audio reproducing means based on said detected turning angle, said two digital filters operating to fold impulse responses for a plurality of audio signals, and further wherein said image reproducing means includes image signal processing means for processing said image signal to fix a picture perception position in a predetermined direction in said viewing/hearing environment according to said turning angle, and wherein said audio reproducing means fixes said direction of said sound in said predetermined direction when said turning angle detected by said turning angle detecting means is within a predetermined angular range, said audio signal processing means processes said audio signal to have said direction of said sound move synchronously with said head turning movement when said turning angle detected by said turning angle detecting means is outside of said predetermined angular range, said image reproducing means processes said image signal to have said direction of said picture perception position move synchronously with said head turning movement when said turning angle detected by said turning angle detecting means is outside of said predetermined angular range.

14. An image and audio reproducing apparatus comprising:

a head attaching means for attaching to the head of a user;

audio reproducing means mounted on said head attaching means for reproducing an audio signal and outputting a sound to the user from a loudspeaker based on said reproduced audio signal;

image reproducing means mounted on said head attaching means for reproducing an image signal and displaying a picture to the user based on said reproduced image signal; and turning angle detecting means for detecting a turning angle at which said user wearing said head attaching means and said image and audio reproducing apparatus turns his/her head;

wherein said audio reproducing means includes audio signal processing means for adding one of a time difference, a phase difference, a level difference, and a frequency response to an output of each of two digital filters included in said audio reproducing means based on said detected turning angle, said two digital filters operating to fold impulse responses for a plurality of audio signals, and further wherein said image reproducing means includes image signal processing means for processing said image signal to fix a picture perception position in a predetermined direction in said viewing/hearing environment according to said turning angle, and wherein said audio reproducing means and said image reproducing means respectively fix said direction of said sound and said direction of said picture in said predetermined direction when said turning angle detected by said turning angle detecting means is within a predetermined angular range, said audio signal processing means processes said audio signal to have said direction of said sound move synchronously with said head turning movement and said image reproducing means processes said image signal to have said direction of said picture perception position move synchronously with said head turning movement when said turning angle detected by said turning angle detecting means is outside of said predetermined angular range.

15. The image and audio reproducing apparatus according to claims 13 or 14, further comprising a position correcting means for correcting a position of said sound to a predetermined position determined by a position of the user's head, said position detecting means being provided on said head attaching means with said turning angle detecting means.

16. The image and audio reproducing apparatus according to claims 13 or 14, wherein a piezoelectric oscillation gyro operating as an angular velocity sensor is used as said turning angle detecting means.

17. The image and audio reproducing apparatus according to claims 13 or 14, wherein a geomagnetic azimuth sensor is included in said turning angle detecting means.

18. The image and audio reproducing apparatus according to claims 13 or 14, wherein said turning angle detecting means calculates said turning angle based on a ratio between an output of light emitting means located proximate said turning angle detecting means and outputs of at least two light intensity sensors provided on said head attaching means.

19. The image and audio reproducing apparatus according to claim 15, wherein said position detecting means calculates said position of the user's head based on a ratio between an output of light emitting means located proximate said turning angle detecting means and outputs of at least two light intensity sensors provided on said head attaching means.

20. The image and audio reproducing apparatus according to claim 15, wherein said turning angle detecting means respectively calculates said turning angle and said position of said head based on a ratio between an output of light emitting means located proximate said turning angle detecting means and outputs of at least two light intensity sensors provided on said head attaching means.

21. The image and audio reproducing apparatus according to claims 13 or 14, further comprising wireless means whereby said audio signal is supplied to said audio reproducing means provided on said head attaching means.

22. The image and audio reproducing apparatus according to claims 13 or 14, further comprising wireless means whereby said image signal is supplied to said image reproducing means provided on said head attaching means.

23. The image and audio reproducing apparatus to claims 13 or 14, wherein said image reproducing means respectively displays a different picture for viewing by each eye of the user.

24. The image and audio reproducing apparatus according to claims 13 or 14, wherein said image reproducing means selectively displays a portion of said image signal according to said turning angle detected by said turning angle detecting means.

* * * * *